United States Patent [19]

Smith

[11] Patent Number: 4,893,202

[45] Date of Patent: Jan. 9, 1990

[54] VIDEO TAPE RECORDER CONTROL SYSTEM

[75] Inventor: William V. Smith, Memphis, Tenn.

[73] Assignee: Lectrolarm Custom Systems, Inc., Memphis, Tenn.

[21] Appl. No.: 169,052

[22] Filed: Mar. 16, 1988

[51] Int. Cl.$^4$ ............................................. G11B 31/00
[52] U.S. Cl. ..................................... 360/79; 358/185; 358/210; 358/108
[58] Field of Search ..................... 360/79, 80; 358/185, 358/210, 108

[56] References Cited

U.S. PATENT DOCUMENTS

| | | | |
|---|---|---|---|
| 3,686,434 | 8/1972 | Lemelson | 358/210 X |
| 3,688,262 | 8/1972 | Liguori | 360/80 X |
| 3,882,545 | 5/1975 | Titus, IV | 360/79 X |
| 4,172,264 | 10/1979 | Taylor et al. | |
| 4,188,644 | 2/1980 | Thiewes et al. | |
| 4,194,198 | 3/1980 | Baer et al. | 360/79 X |
| 4,244,006 | 1/1981 | Kitahara et al. | 358/185 X |
| 4,261,020 | 4/1981 | Beeson et al. | |
| 4,308,563 | 12/1981 | Gohda et al. | |
| 4,321,625 | 3/1982 | Smith | 358/210 |
| 4,326,221 | 4/1982 | Mailos et al | 358/210 |
| 4,340,903 | 7/1982 | Tamura | |
| 4,422,105 | 12/1983 | Rodesch et al. | |
| 4,570,163 | 2/1986 | Smith | 358/210 |
| 4,631,590 | 12/1986 | Tameda et al. | |
| 4,688,105 | 8/1987 | Block et al. | 369/12 X |
| 4,714,959 | 12/1987 | Pshtissky | 358/185 X |

FOREIGN PATENT DOCUMENTS

| | | | |
|---|---|---|---|
| 751360 | 6/1956 | United Kingdom | 360/79 |
| 2041622 | 9/1980 | United Kingdom | 360/79 |
| 2178584 | 2/1987 | United Kingdom | 360/79 |

OTHER PUBLICATIONS

"Electronic Controls for Machine Tools"; Findlay, Electronics, Feb. 1956, pp. 122-126.

Primary Examiner—Aristotelis M. Psitos
Attorney, Agent, or Firm—Dickstein, Shapiro & Morin

[57] ABSTRACT

An automatic programming and video camera control system is disclosed in which while the camera operator is operating the video camera system, the control signals generated by the operator are converted to a unique plurality of signals for recordation on a mass storage media, such as a video tape recorder. On playback of the mass storage medium, the recorded signals are reproduced, decoded and used to provide automatic control of the video camera system. A modified video tape recorder may be used in which, during playback of the programmed signals, the video images viewed by the video camera are recorded on the video track portion of the magnetic tape.

18 Claims, 3 Drawing Sheets

VIDEO TAPE RECORDER CONTROL SYSTEM

CROSS REFERENCES TO RELATED APPLICATIONS

The inventor herein is also the inventor of U.S. Pat. Application Ser. No. 131,626, filed Dec. 10, 1987, now abandoned and entitled Video Camera Control System. In addition, the inventor herein is also the inventor of the U.S. Pat. Application Ser. No. 197,953, filed May 24, 1988 concurrently herewith entitled "MINIATURIZED VIDEO COMMUNICATION CONTROL SYSTEM". The disclosures of both of those patent applications are incorporated by reference herein.

BACKGROUND OF THE INVENTION

The present invention relates to a programming and control system for the automatic operation of remote controlled devices.

More specifically, the present invention relates to a control system for programming and providing remote control operation of the positioning of a camera and operation of various functions thereof for remote controlled closed-circuit television using the audio track of a video tape recorder tape.

In many known camera control systems, where it is desired to selectively control a plurality of different functions of a member being controlled, it often is the case that, due to the repetitive nature of the surveillance functions provided by the camera, the camera operator often must cause the system to operate through the same functions on a repetitive basis. For example, such closed circuit television camera systems, when used for security surveillance systems, often times repetitively scan the same field of view over the course of minutes, hours or for a set period of time each day.

More specifically, it may be desired that, over the period of an 8-hour work shift, a surveillance camera be repetitively focused on several fields of view. Thus, the camera operator, operating from a location remote from the camera, manually causes the camera to move from one desired field of view to another. Such operation includes the functions of panning and tilting the camera, as well as zooming the camera in and out in order to focus on a particular area within the field of view of the camera. Frequently, the operator will repeat this surveillance either once per eight hour shift, or more often. The operation of a camera control system under such circumstances is both tedious, personnel intensive and time consuming. In addition, it requires the operator to develop a skill in controlling the operation of the remote camera, or many cameras, and thus requires a high degree of both concentration and compensation of the operator.

Under such circumstances, it would be desirable if an inexpensive yet easy to program and readily reproducible system could be developed which would relieve the operator from manually controlling the operation of the camera. In addition to relieving the tedium of such operation and requiring less skilled operators, the personnel viewing the video images from the camera would be able to concentrate their entire attention on the scene viewed by the camera, instead of having to also concentrate on the operation of the camera. Furthermore, closed-circuit television cameras are frequently used under circumstances where hazardous conditions exist and are continually changing, for example, when used outside, the movement of the sun requires frequent yet predictable or easily estimated adjustments of the camera in order to maintain the desired field of view. Thus, it would be desirable if such tasks could be automated to relieve the viewer from having to perform them.

In addition, it is often necessary, for example, in the gaming industry, to record the scenes viewed by the camera on video tape and to store the video tape for later possible review by regulatory officials. Thus, it would be desirable if a system could be developed which would use the already available video tape medium to effectuate automatic programmed control of one or more cameras.

The invention set forth herein provides apparatus for automating the video camera control system disclosed in applicant's above-identified pending patent applications.

SUMMARY AND OBJECTS OF THE INVENTION

In view of the foregoing, it should be apparent that there still exists a need in the art for a system for automating a camera control system for repeatedly controlling a closed circuit television camera in order to move from one field of view to another in a predetermined and desired manner.

It is, therefore, a primary object of the present invention to provide an automatic programming and control system for operating a multi-function camera control system for selectively enabling a plurality of control functions for a video camera in an automatic and predetermined manner.

It is another object of the present invention to provide a programming and automatic camera control system for a multifunction video camera control system in which the control signals for operating the video camera are recorded on a readily available media which can be readily and inexpensively recorded by the camera operator.

It is still another object of the present invention to provide a system for automatically controlling a video camera in a simple and unique manner by recording the control signals on the audio track of a video tape unit, such as a video tape recorder.

It is yet a further object of the present invention to provide an automatic control system which utilizes a video tape recorder for controlling a remotely located video camera at the same time that the video tape recorder is recording a video signal on the video tape used by the that video tape recorder.

It is yet another object of the present invention to provide a programming and control system for a video camera in which the control signals are recorded on the audio portion of a video tape by a video tape recorder and are encoded in the form of dual tone multi-frequency signals.

It is still another object of the present invention to provide a system for programming and automatically operating in a predetermined manner a video camera system such that any function that can be performed by the video camera system can be controlled by recording the appropriate signals utilizing the present invention.

It is yet another object of the present invention to provide a system for programming and automatically controlling a remotely controlled video camera system which, once actuated, automatically records the camera functions utilized by the operator while operating the camera.

It is yet a further object of the present invention to provide a system for programming and automatically operating a video camera control system in which the camera can be controlled simultaneously with recording the video signals seen by the camera in a manner that is reproducible and easily implemented.

It is a further object of the present invention to provide a system for programming and automatically operating a video camera system in which the recorded control signals are easily utilized by camera operator to control the video camera system.

It is still another object of the present invention to provide a system for programming and automatically operating a video camera control system in which any electronic mass storage medium including video tape, hard or floppy disks, or CD-ROMS can be utilized as the medium for storing and reproducing the camera control signals.

These and other objects are accomplished by the instant invention by means of a programming circuit which is connected to the input circuit utilized by the camera operator to control the operation and movement of the camera. The input circuit controls such functions as the up, down, left or right movement of the camera, the zooming in or zooming out of the camera lens, the focus and iris functions of the camera and other auxiliary functions such as the auto iris function disclosed in applicant's copending U.S. Pat. Application Ser. No. 131,626.

As the camera operator actuates any camera function, a unique dual tone multi-frequency (DTMF) signal is generated by the programming circuit and is recorded on the audio track of, for example, a video tape recorder. The operation of the programming circuit and video tape recorder is transparent to the camera operator's control of the video camera.

When it is desired to reproduce the operator's control movements of the camera, the tape in the video tape recorder is rewound and then the video tape recorder is placed in the record position. The video tape recorder used in the present invention may be specially modified such that in the record mode a video signal is recorded but the signal on the audio track is reproduced as in the playback mode. Thus, while the recorded program is utilized to control the video camera, the scene seen by the video camera is recorded on the video portion of the tape.

The signals output by the play head during the record mode of the modified video tape recorder are decoded by a decoder circuit which converts the dual tone multi-frequency signals recorded on the tape to the appropriate control signals recognizable by the camera control circuitry for instructing the video camera to perform the desired function.

It should be understood that, while it is desirable that a modified video tape recorder or video cassette player be utilized with the present invention, the programming circuit can record the dual tone multi-frequency signals corresponding to the selected camera function on any tape recorder, whether video or audio, which, when rewound and placed in the play position, will reproduce the recorded signals for decoding by the decoder circuitry. In addition, through the use of appropriate additional analog to digital and digital to analog circuitry, the signals produced by the programming circuit can be stored on other magnetic storage media such as floppy disks or hard disks, or could also be stored on a CD-ROM.

DETAILED DESCRIPTION OF THE PREFERRED EMBODIMENT

Figure 1:
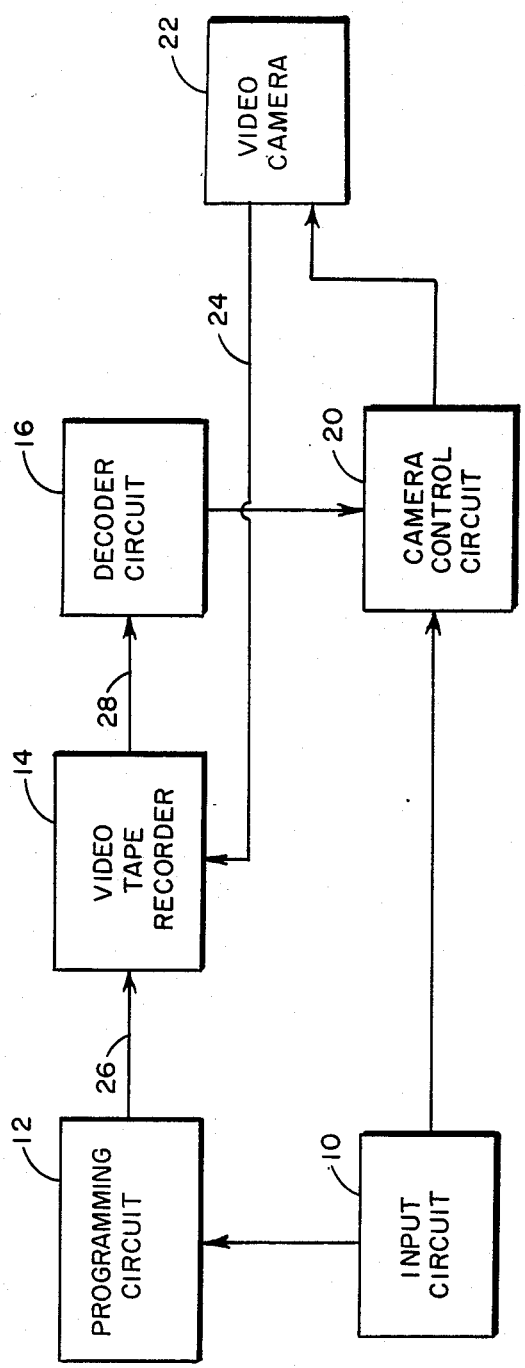
FIG. 1 is a block diagram showing the sub-systems which form the apparatus or the present invention.

Referring now in detail to the drawings wherein like parts are designated by like reference numerals throughout, there is illustrated in FIG. 1 a block diagram schematic of the circuitry of the present invention. An input circuit 10 is connected to the inputs of both a programming circuit 12 and a camera control circuit 20. The input circuit is comprised of a plurality of control switches, which will be described in more detail in connection with FIG. 2.

The output from the input circuit is transmitted as the input to the camera control circuit 20. The camera control circuit 20 may be, for example, the circuitry set forth in FIGS. 4-7 of applicant's co-pending U.S. Pat. Application Ser. No. 131,626, which discloses a video camera control system utilizing a single conductor control line. Alternatively, as is described in connection with FIGS. 2 and 3 herein, the camera control circuit 20 may comprise a series of motors and actuators which are hardwired to the input circuit 10 by means of a multiconductor cable. In any event, the camera control circuit is connected to the video camera in a known manner such that the pan/tilt, zoom, focus, iris, auto-iris or other auxiliary functions of the camera may be remotely controlled by an operator utilizing the input circuit 10.

At the same time that an operator is controlling the video camera 22 by means of the input circuit 10, an additional output signal is generated which is used by the programming circuit 12 to generate a dual tone multi-frequency signal which is unique to the specific function then being actuated by the operator. The DTMF signal is generated for a period of time corresponding to the exact time that the camera operator is actuating the input circuit 10 and the camera control circuit 20 to cause the video camera 22 to perform one of its many functions. Thus, the dual tone multi-frequency signals generated by the programming circuit 10 in response to receiving the input control signals from the input circuit 10 duplicate exactly the control signals generated by the input circuit 10 for transmission to the camera control circuit 20 for controlling the video camera 22.

The output from the programming circuit 12 may be recorded on the audio portion of the magnetic tape utilized by a video tape recorder 14. If it is contemplated that the video tape recorder 14 is to record the scenes seen by the video camera 22, then such video tape recorder may be modified in order to perform a video recording and audio playback simultaneously. Thus, when the video tape recorder is first actuated for use with the programming phase of the present invention, the video camera is placed in a known starting position and then the video tape recorder is placed in its normal record position. However, only the signal from the programming circuit by means of line 26 is input into the video tape recorder, using the audio input terminals. Then, every control function utilized by the operator by means of input circuit 10 to control the video camera 22 will be recorded, as DTMF signals, on the audio track of the video tape recorder 14.

After the recording has been completed, the tape is rewound and then the video tape recorder 14 can be placed in the play mode in which case the signals appearing at the audio output terminal of the video tape recorder, on line 28, correspond exactly to the functions previously actuated by the camera operator. It is necessary, however, to return the video camera 22 being controlled to its initial known starting position before placing the video tape recorder 14 in the play mode to automatically control the video camera 22.

If, however, as is frequently desired, the images seen by the camera as it is operated by the thus programmed video tape are to be recorded, the video tape recorder 14 must be placed in a special modified record/playback function position. In that position, the video signal output from the video camera 22 on line 24 is recorded on the video track while the DTMF signals previously recorded on the audio track are played back and output on line 28 to the decoder circuit 16.

Figure 3:
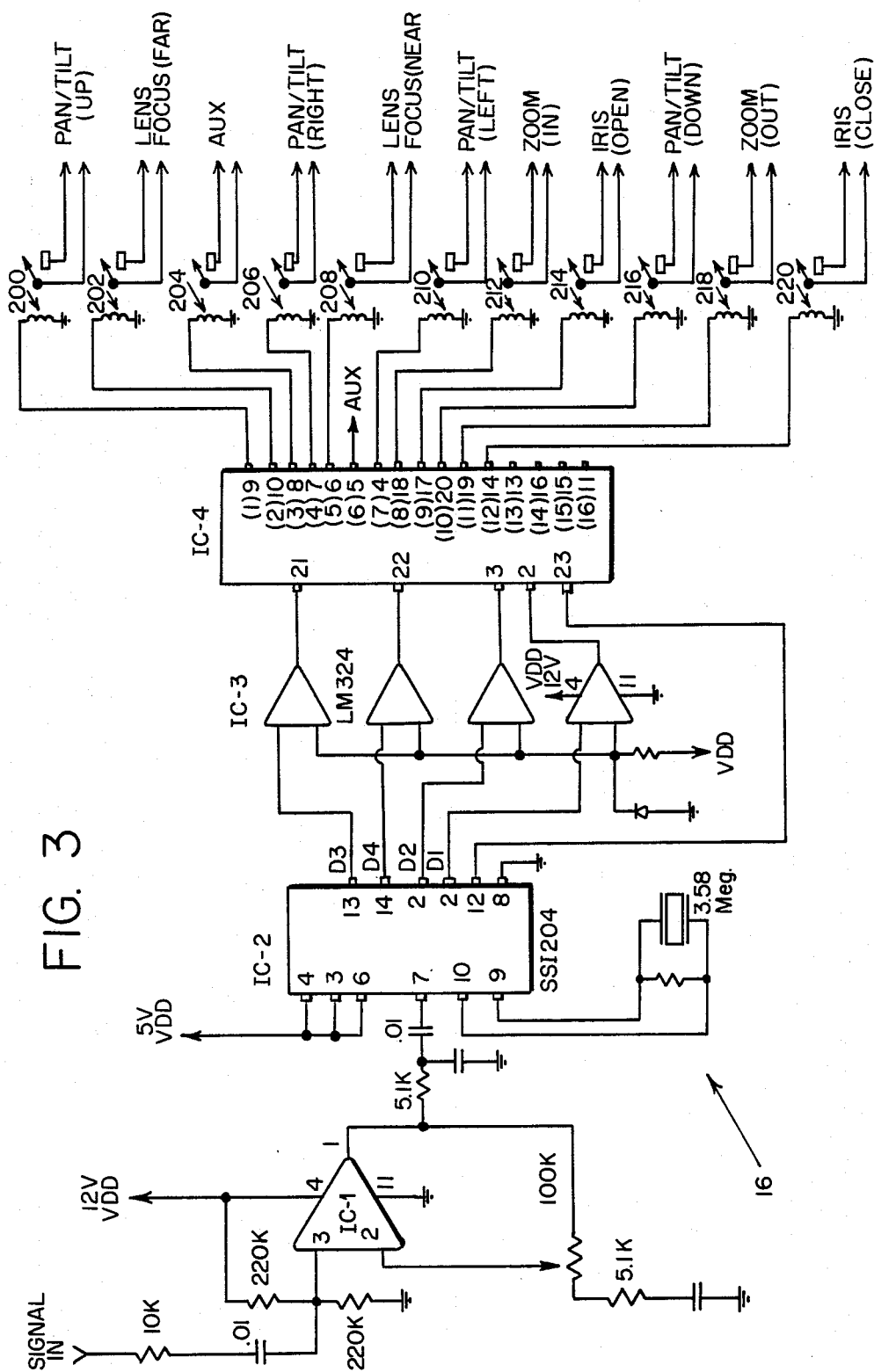
FIG. 3 is an electrical schematic diagram showing the circuitry of the decoder circuit of the present invention.

The decoder circuit 16 functions to translate the dual tone multi-frequency signals into signals with which can readily be used by the camera control circuit 20 to control the operation of the video camera 22. As previously discussed, the output from the decoder circuit can be via a single control line as disclosed in applicant's co-pending patent application Ser. No. 131,626, or, as shown in FIG. 3, can be hardwired directly to the appropriate control motors or other devices utilized to operate the video camera 22.

In addition, other methods of generating unique signals corresponding to a selected actuated video camera function can be used in place of the DTMF signals. One such illustrative example is frequency shift keying or FSK signals.

Figure 2:
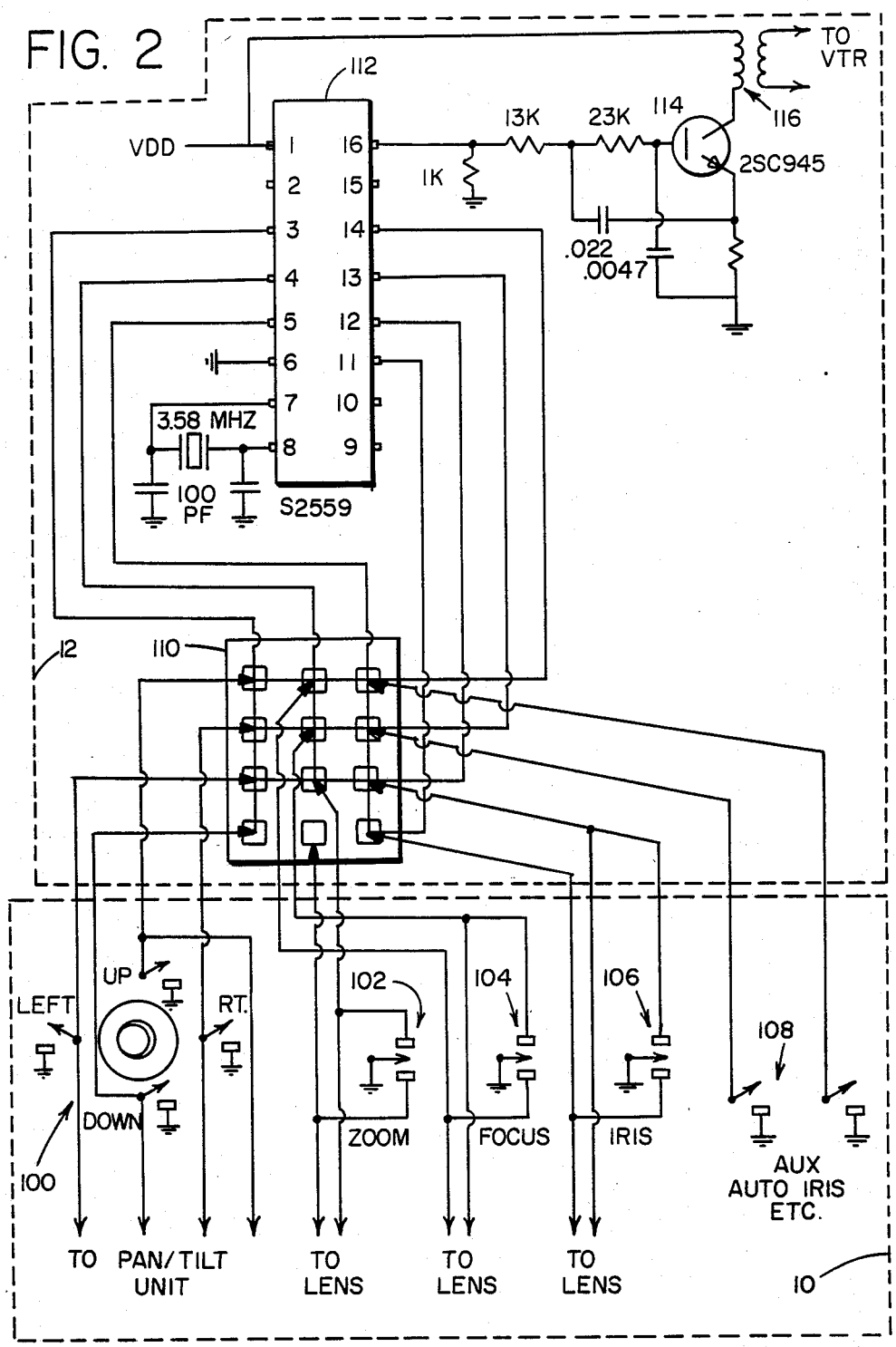
FIG. 2 is an electrical schematic diagram showing the circuitry for the programming and input circuits of the present invention.

Referring now to FIG. 2, there is shown an electrical schematic diagram of the input circuit 10 and the programming circuit 12. The input circuit 10 is comprised of a joy stick 100 which includes four contacts which generate a voltage on each respective output line which causes the camera to pan or tilt in the up, down, left or right direction. The input circuit 10 also includes a zoom switch 102 which produces a voltage on the appropriate lines which cause the lens of the camera to zoom in either the in or the out direction, depending upon the position of the switch.

Also included in the input circuit 10 is a focus control switch 104 and an iris control switch 106 which operate in a manner similar to that of the zoom switch 102 previously described. An auxiliary auto iris switch 108 which may function to operate an auto iris circuitry or perform other auxiliary functions with respect to the video camera to be controlled is also provided.

Each of the switches 100, 102, 104, 106 and 108 are connected to the camera control circuit or hardwired directly to control the functions of the video camera control circuit 20 and are also connected to a different terminal of a standard pushbutton telephone keypad 110. Therefore, as the operator is moving the appropriate control and the respective switch 100, 102, 104, 106 and/or 108 makes contact, it closes the appropriate contact at the pushbutton 110 which causes the generation of a dual tone multi-frequency signal by means of the DTMF chip which may be a part number S2559, manufactured by AMI.

The DTMF chip is part of the programming circuitry 12 and can provide up to 16 different frequencies at the output of pins 2–5 and 14–11. For purposes of the instant invention, those frequencies produced at the output of pins 3–5 and 11–14 are utilized and are combined by the wiring of the keypad 110. A sample terminal strip or other set of terminals could be utilized in place of the keypad. The output of the DTMF chip at pin 16 is fed through a resistor and capacitor network to the base of a transistor 114 whose collector is connected through one coil of an isolation transformer 116 to pin 1 of the DTMF chip 112. The transistor 114 may preferably be part number 2SC945, manufactured by RCA.

The output terminals of the isolation transformer 116 are connected to the audio input of a video tape recorder, or other magnetic storage medium device. The ratio of the input coil to the output coil of the isolation transformer 116 may preferably be 1:1. The signal produced at the output of the isolation transformer 116 is a real time signal which exactly corresponds to each of the movements of the switches 100, 102, 104, 106 and 108 made by the camera operator during his operation of the video camera 22.

Referring now to FIG. 3, there is shown therein an electrical schematic diagram of the decoder circuit 16 which may preferably be at the location of the input or programming circuits. The video camera 22 is generally located at a position remote from the operator viewing what is seen by the camera and controlling the video camera 22 by means of the input circuit 10 and, subsequently, the programming circuit 12 and video tape recorder 14.

After the operation of the video camera 22 by the operator and the recording of the settings of the switches 100, 102, 104, 106 and 108, the recorded tape is placed into the video or other magnetic tape recorder and the DTMF signals recorded thereon are played back. The signals are fed via line 28 into the signal in port of the decoder circuit 16 and then into an input terminal of IC1, which may preferably be an op amp Model LM324, which functions as an audio amplifier. The output of that op amp is fed into input pin 7 of IC2 which may preferably be a model number SSI 204 chip, available from Silicon Systems Inc.

IC2 functions as a decoder-to-binary-coded-decimal chip and produces up to four outputs D1, D2, D3 and D4 at output pins 2, 1, 13 and 14. The output from pin 12 of IC2 is connected to the enable pin 23 of IC4 so that, when a signal appears on at least one of the D1, D2, D3 or D4 signal lines of IC2, the IC4 chip is enabled. The IC4 chip is preferably a model number CD4514 chip which is a 16 position dual latch decoder chip available from Radio Corporation of America.

The outputs D1, D2, D3 and D4 are each fed to an individual input of one of four op amps contained on a model LM324 quad op amp integrated circuit, IC-3 which functions as a buffer. The other input terminal of each of the op amps is connected to a 12-volt power source VDD.

The output from each of the op amps of IC3 is fed to a respective input terminal of chip IC4, namely, input terminals 21, 22, 3 and 2. That integrated circuit determines, based upon the particular signals received at its input terminals, on which of 12 output terminals a predetermined voltage should be generated. Each of these voltages serves to close a relay 200, 202, 204, 206, 208, 210, 212, 214, 216, 218 or 220 which corresponds to the pan/tilt unit up, lens focus (far), auxiliary, pan/tilt right, lens focus (near), pan/tilt left, zoom (in), iris (open), pan/tilt (down), zoom (out) or iris (close). In addition, a voltage on pin 5 can be used to enable an auxiliary function, as can a voltage at pins 13, 16, 15 or 11. The auxiliary function could be used, for example, to actuate a different camera to be controlled under programmed control using the same tape. Thus, a plurality of video cameras could be sequentially controlled by a single programmed signal source.

As previously described, the outputs produced by closing the switches 200-220 can be used in a hardwired camera system to directly operate the appropriate camera function. Alternatively, those outputs can be utilized through, for example, a diode network disclosed in applicant's co-pending patent applications, to operate the same camera functions using only a single line connection between the decoder 16 and the video camera 22.

It should be understood that while the present invention is designed to record DTMF signals, any means of producing and interpreting an audio signal may be used to accomplish the results of the invention. In addition, the invention can be utilized with any number of closed circuit remote control television cameras as that, for example, disclosed in applicant's co-pending U.S. Pat. Application Ser. No. 131,626, except that a separate audio track must be recorded for each camera to be controlled. Generally, that will require a separate video tape recorder for each camera to be controlled, since it is usually desirable to record the video signals from the camera onto the video tape as the audio signal is read from the tape controlling the camera. After each tape is maintained for a predetermined number of days, it may be reused to again control the operation of the video camera and the new material seen by the video camera recorded over the previous material. Thus, the procedure through which the operator controls the video camera can be repeated without human assistance, once the video tape has been programmed by the instant invention.

As has been explained, a standard video tape recorder available from many manufacturers may be used with the present invention. If it is desired to record the image seen by the video camera as it is being controlled under program control, the video tape recorder must be modified such that, upon being placed into the record mode, the playback head for the audio track is actuated rather than the record head. At the same time, the video heads must be in their record mode. It should also be understood that any type of video tape recorder or video cassette recorder, whether using a beta, VHS or 8mm format, or any other format, may be used to produce the same result.

In addition, any magnetic storage device or optical storage device that can reproduce a signal recorded thereon may be used to control the operation of the camera to duplicate the procedures performed by the operator without the need for human assistance. Thus, for example, a simple and inexpensive audio cassette tape recorder can be used with which to record the DTMF or other signals. The tape can then be rewound and played back and the output signal thereof fed through the decoder circuit 16 for controlling the video camera 22.

It is important, however, that the camera must always be placed in the same start position as it was when the operator generated the programming signals, so that the operation of the camera under program control will conform to the operations performed by the operator. This function may be accomplished manually by the operator or automatically by the input circuit 10, if, for example, the input circuit 10 provides for a plurality of camera presets. Such presets are disclosed in co-pending U.S. Pat. Application Ser. No. 131,626.

It should also be noted that the instant invention, as disclosed, allows for only one function at a time to be recorded on the video tape recorder 14. However, with appropriate circuit changes, the recording of simultaneous functions would be achievable.

Since each set of recorded programming signals is unique to the particular video camera to be controlled, the present invention has the advantage that it will operate with any of the currently available pan/tilt and motor controlled video camera systems. The fact that such systems use motors which operate at different speeds is therefore of no concern to the use of the present invention.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. An automatic control system for a video camera, comprising:
   an input circuit for generating control signals for operating at least one video camera;
   a converter for converting said control signals to data signals suitable for recording on an audio track of a storage medium;
   a recording and reproducing apparatus for recording and reproducing said data signals on said storage medium;
   a decoder for decoding said reproduced data signals such that said recording/reproducing apparatus uses said data signals to directly control said at least one video camera;
   wherein said recording and reproducing apparatus comprises a video tape recorder comprised of:
   a recording and reproducing apparatus for recording said data signals and
   for reproducing said data signals from said audio track while simultaneously recording a video signal from said at least one video camera on a video track of said video tape recorder.

2. The system of claim 1, wherein said recorded video signal corresponds to the images viewed by said video camera system while under control of said data signals recorded on said video tape recorder.

3. The system of claim 1, wherein said data signals comprise audio frequency representations of a plurality of control signals.

4. The system of claim 1, wherein said recorder for recording said data signals comprises an audio recording head.

5. A control system for automatically providing a plurality of control signals in which each signal serves to control a function of a video camera system capable of a plurality of different functions, said control system comprising:
   an input circuit for generating a plurality of different control signals;

a converter for converting each of said plurality of different control signals to data signals;

a recorder for recording each of said data signals and for reproducing said recorded data signals while simultaneously recording video signals generated by said video camera system using said same recorder; and a decoder for decoding each of said data signals reproduced by said recorder to generate said plurality of control signals for operating said plurality of different control functions of said video camera system.

6. The system of claim 6, wherein said recorder comprises a magnetic tape recorder.

7. The system of claim 6, wherein said converter converts said control signals to dual tone multifrequency signals.

8. The system of claim 6, wherein said recorder comprises a video tape recorder.

9. The system of claim 6, wherein said video tape recorder is comprised:

a recording and reproducing apparatus for recording said data signals and for reproducing said data signals from said audio track while simultaneously recording a video signal from said at least one video camera on a video track of said video tape recorder.

10. The system of claim 9, wherein said recorded video signal corresponds to the images viewed by said video camera system while under control of said data signals recorded on said video tape recorder.

11. The system of claim 9, wherein the control of said video camera system and the recording of said video signal from said video camera occurs in real-time.

12. The system of claim 5, further including a positioning device for positioning said video camera system in a predetermined configuration prior to beginning the automatic control of said video camera system.

13. A camera control system comprising:

an input device for generating camera movement in a plurality of directions;

a converter connected to said input device for generating a data signal in response to signals received from said input device such that said data signal represents the movement of said input device;

a video tape recorder for recording said data signal on an audio track of a video tape such that said data signal is reproduced simultaneously while recording a video signal on a video track of said video tape recorder;

a decoder for decoding said data signal to a predetermined voltage level; and a sensor for sensing said predetermined voltage level and controlling particular camera functions based upon said sensed predetermined voltage level.

14. The system of claim 13, wherein said mass storage medium is magnetic tape.

15. The system of claim 13, wherein said means for converting converts said control signals to dual tone multifrequency signals.

16. The system of claim 13, wherein said recorded video signal corresponds to the images viewed by said video camera system while under control of said control signals recorded on said video tape recorder.

17. The system of claim 16, wherein the control of said video camera system and the recording of said video signal from said video camera occurs in real-time.

18. A method for automatically controlling at least one video camera using a recorder, comprising the steps of:

generating camera control signals for controlling said at least one video camera;

converting said camera control signals to data signals for recording on a storage medium;

recording said data signals simultaneously with controlling said at least one video camera;

reproducing said data signals simultaneously with recording a video signal;

decoding said data signals; and controlling said at least one video camera through said decoded data signals directly from said recorder to said at least one video camera.

* * * * *